(12) United States Patent
Stappers et al.

(10) Patent No.: US 7,709,555 B2
(45) Date of Patent: May 4, 2010

(54) COATING COMPOSITION BASED ON THIOL-NCO CURING

(75) Inventors: Franciscus Huburtus Maria Stappers, Leiden (NL); Joseph Theodorus Maria Van Dijk, Leiden (NL)

(73) Assignee: Akzo Nobel Coatings International, Arnhem (NL)

( * ) Notice: Subject to any disclaimer, the term of this patent is extended or adjusted under 35 U.S.C. 154(b) by 0 days.

(21) Appl. No.: 11/663,372

(22) PCT Filed: Sep. 16, 2005

(86) PCT No.: PCT/EP2005/054628

§ 371 (c)(1), (2), (4) Date: Jul. 31, 2007

(87) PCT Pub. No.: WO2006/030029

PCT Pub. Date: Mar. 23, 2006

(65) Prior Publication Data

US 2008/0194720 A1 Aug. 14, 2008

(30) Foreign Application Priority Data

Sep. 17, 2004 (EP) .................................. 04077582

(51) Int. Cl.
*C08F 2/46* (2006.01)
*C08F 2/50* (2006.01)
*C08J 3/28* (2006.01)

(52) U.S. Cl. ....................... 522/176; 522/173; 522/178; 522/180; 525/455; 528/79

(58) Field of Classification Search ................. 522/167, 522/173, 174; 525/455; 528/79
See application file for complete search history.

(56) References Cited

U.S. PATENT DOCUMENTS

| 3,789,045 | A | * | 1/1974 | Coury et al. ................... 528/48 |
| 4,164,459 | A | | 8/1979 | Noomen et al. |
| 4,668,713 | A | * | 5/1987 | Woods et al. ................ 522/174 |
| 5,126,421 | A | | 6/1992 | Majewski et al. |
| 5,591,819 | A | * | 1/1997 | Chou et al. .................... 528/73 |
| 6,545,117 | B1 | | 4/2003 | Moos et al. |
| 6,639,046 | B1 | | 10/2003 | Van Dijk et al. |
| 2003/0212164 | A1 | * | 11/2003 | Klinkenberg et al. ....... 522/173 |

FOREIGN PATENT DOCUMENTS

| DE | 40 17 941 | 12/1991 |
| EP | 0 448 224 B1 | 9/1991 |
| EP | 0 527 427 | 2/1993 |
| EP | 0 531 249 | 3/1993 |
| EP | 0 686 654 | 12/1995 |
| EP | 0 882 072 B1 | 12/1998 |
| GB | 1311211 | 3/1973 |
| GB | 2 307 473 A | 5/1997 |
| WO | WO 93/17060 | 9/1993 |
| WO | WO 94/28075 | 12/1994 |
| WO | WO 01/92362 | 12/2001 |
| WO | WO 01/92363 | 12/2001 |

OTHER PUBLICATIONS

Written Opinion of the International Search Authority, PCT International Patent Application No. PCT/EP2005/054628.
International Search Report, PCT International Application No. PCT/EP2005/054628.
International Preliminary Report on Patentability, PCT International Application No. PCT/EP2005/054628.
Harkness et al., "Demonstration of a Directly Photopatternable Spin-On-Glass Based on Hydrogen Silsesquioxane and Photobase Generators," *Macromolecules*, vol. 31, No. 15, 1998, pp. 4798-4805.

* cited by examiner

*Primary Examiner*—Sanza L McClendon
(74) *Attorney, Agent, or Firm*—Kenyon & Kenyon LLP

(57) ABSTRACT

Coating composition comprising one or more polythiols and one or more polyisocyanates and a latent base catalyst which is activatable by moisture, wherein the equivalence ratio NCO:SH is between 1:2 and 2:1. The latent catalyst is selected from the group of oxazolidine, aldimine, ketimine, and enamine. The latent catalyst is present in an amount of up to 20% relative to the weight of the curable material. The composition further comprises one or more photoinitiators in an amount of up to 4% relative to the weight of the curable material.

23 Claims, No Drawings

COATING COMPOSITION BASED ON THIOL-NCO CURING

The present invention relates to a coating composition comprising one or more polythiols, one or more polyisocyanates, and a deactivated base catalyst.

Coating compositions based on polythiols and polyisocyanates are catalyzed by base catalysts. To prevent premature cross-linking, the base catalysts can be blocked or deactivated. WO 01/92362 discloses compositions based on thiol-isocyanate cross-linking using a photolatent base. To cure such coatings, the freshly applied layers need to be irradiated with actinic radiation of the right wavelengths. Hence, such coatings are less useful when large surfaces are to be coated, such as garage floors and the like. Moreover, some spots of the surface may be more difficult to irradiate. The curing speed on such shadow spots is low.

The object of the invention is to provide a coating composition which has a long pot life but a fast curing speed over the complete substrate, including shadow spots.

The object of the invention is achieved with a coating composition comprising one or more polythiols, one or more polyisocyanates, and a deactivated base catalyst which is activatable by moisture. The equivalence ratio NCO:SH, the number of NCO groups relative to the number of SH groups, is between 1:2 and 2:1.

Moisture activatable base compounds, such as oxazolidines, are generally reactive with isocyanate groups. For this reason, such compounds are used as crosslinkers for polyisocyanates. Surprisingly, it was found that in thiol-isocyanate crosslinking systems these compounds are not bound by the isocyanate groups on a substantial scale but rather function as a catalyst for the thiol-isocyanate crosslinking under the influence of moisture.

Oxazolidines are suitable compounds reacting with moisture to form a base which is able to catalyze SH-NCO reactions. Suitable oxazolidines are for example carbonato-bis-N-ethyl-2-isopropyl-1,3-oxazolidine, commercially available as Incozol® LV, 2-(3-heptyl)-N-butyl-1,3-oxazolane, commercially available as Incozol® 2, and urethane bis-oxazolidines, such as those which are commercially available as Hardener OZ. Other suitable latent base compounds are for example enamines, ketimines, and aldimines.

The latent catalyst can be present in an amount of, e.g., up to 20% relative to the weight of the curable material; e.g. 0.01-6%, such as 3.5-5%.

In a further embodiment, the coating composition may further comprise one or more photoinitiators, forming radicals under the influence of light. Surprisingly, it was found that drying was accelerated considerably, about 2-20 times, even in pigmented systems applied in thick layers. This effect particularly occurred when using oxazolidine as a catalyst. The photoinitiator can for example be present in an amount of 0.01-2.0% relative to the weight of the curable material, e.g., in an amount of 0.1 to 1.0%.

Suitable photoinitiators are for example ethyl 4-(dimethylamino)benzoate (Speedcure® EPD), 2-(dimethylamino) ethyl benzoate (Speedcure® DMB), 4-benzoyl-4'-methyl-diphenyl sulphide (Speedcure® BMS), 2-ethylhexyl-4-dimethylaminobenzoate (Speedcure® EHA); 1,3,5-trimethylbenzoyl diphenylphosphine oxide (Speedcure® TPO), all available from Lambson. A photoinitiator for use in visible daylight is for instance bis (4-cylcopentadien-1-yl)-bis [2,6-difluoro-3-(1H-pyrrol-1-yl)-phenyl]titanium (Irgacure® 784, Ciba Specialty). Other suitable photoinitiators include ketones, such as methyl ethyl ketone, 2,3-butanedione, 1-hydroxy cyclohexyl phenyl ketone, 2-hydroxy-2-methyl-1-phenyl propan-1-one, and aromatic ketones, e.g., acetophenone, benzophenone, 4-aminobenzo-phenone, 4,4'-diaminobenzophenone, 4,4'-bis(dimethylamino) benzophenone, valero-phenone, hexanophenone, o-methoxybenzophenone, α-phenylbutyrophenone, γ-phenylbutyrophenone, p-morpholinopropiophenone, dibenzosuberone, -4-morpholinobenzophenone, 4-methoxyacetophenone, p-diacetylbenzene, 1,3,5-triacetylbenzene; benzoin compounds, e.g., benzoin, benzoin methyl ether and benzoin ethyl ether, 4-morpholinodeoxybenzoin; quinone and anthrone compounds, e.g., hydroquinone, anthraquinone, napthoquinone, acenaphthenequinone, and 3-methyl-1,3-diazo-1,9-benzanthrone; phenolic compounds, e.g., 2,4-dinitro-phenol; phosphine compounds such as triphenyl-phosphine and tri-o-tolyphosphine; azo compounds, e.g., azobisisobutyronitrile; thioxanthone compounds including for example 2,4-diethoxythioxanthone, isopropylthioxanthone (Speedcure® ITX), 1-chloro-4-propoxythioxanthone (Speedcure® CPTX); and 2-chlorothioxanthone; and various other compounds, e.g., benzil, benzaldehyde, 1-naphthaldehyde, α-tetralone, 2-acetylphenanthrene, 3-acetylphenanthrene, 9-acetyl-phenanthrene, 10-thioxanthenone, 3-acetylindole, 9-fluorenone, 1-indanone, 9-xanthenone, 9-thioxanthenone, 7-H-benz[de]anthracen-7-one, 1-acetonaphthone and 2-acetonaphthone. Alternatively, the photoinitiator can be a phosphine oxide compound, such as 2,4,6-trimethyl benzoylphenyl phosphine oxide (Lucirin® TPO, available from BASF) or acyl phosphine oxide compounds, such as mono- bis- or trisacyl phosphine oxide or mixtures thereof. An example of a bisacylphosphine oxide photoinitiator is bis(2,4,6-trimethylbenzoyl)-phenyl-phosphine oxide (Irgacure® 819, available from Ciba Specialty Chemicals) or bis(2,6-dimethoxy-benzoyl)-2,4,4-trimethyl pentyl phosphine oxide (DMBAPO, Irgacure® 403, available from Ciba Specialty Chemicals). Mixtures of different photoinitiators may be used.

Alternatively, or additionally, one or more photolatent bases can be used, e.g., the photolatent bases as disclosed in WO 94/28075 and EP-A 0 882 072. Suitable photolatent bases include N-substituted 4-(o-nitrophenyl) dihydropyridines, optionally substituted with alkyl ether and/or alkyl ester groups, and quaternary organo-boron photoinitiators. An example of an N-substituted 4-(o-nitrophenyl) dihydropyridine is N-methyl nifedipine (*Macromolecules* 1998, 31, 4798), N-butyl nifedipine, N-butyl 2,6-dimethyl 4-(2-nitrophenyl) 1,4-dihydropyridine 3,5-dicarboxylic acid diethyl ester, and a nifedipine according to the following formula

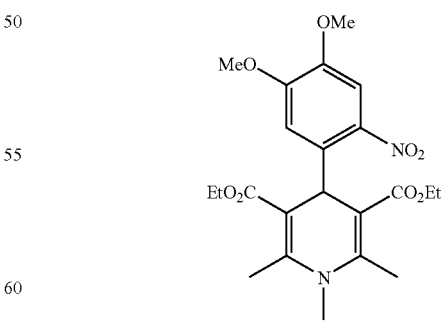

i.e., N-methyl 2,6-dimethyl-4-(4,5-dimethoxy-2-nitrophenyl) 1,4-dihydropyridine 3,5-dicarboxylic acid diethyl ester. Examples of quaternary organo-boron photoinitiators are disclosed in GB-A-2 307 473, such as

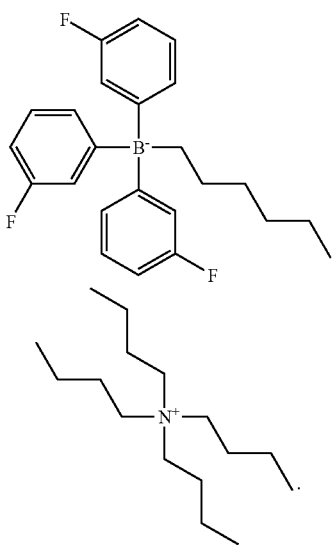

A further suitable alternative is a photolatent base belonging to the group of α-amino acetophenones. Examples of α-amino acetophenones which can be used are 4-(methylthiobenzoyl)-1-methyl-1-morpholinoethane (Irgacure® 907 ex Ciba Specialty Chemicals), (4-morpholinobenzoyl)-1-benzyl-1-dimethylamino propane (Irgacure® 369 ex Ciba Specialty Chemicals) or an α-amino acetophenone according to the following formula

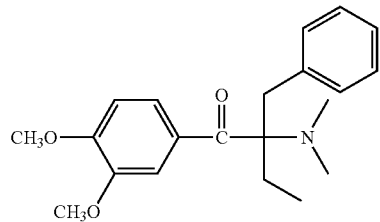

Furthermore, it was found that for these light-accelerated moisture curing systems, the pot life could be increased considerably by the addition of an inorganic acid (such as nitric acid), even when small amounts, e.g., 0.005-0.05 wt. %, were used. The addition of small amounts of acid hardly influences the cure time.

Suitable polythiols can be prepared by reacting hydroxyl group-containing compounds with thiol group-containing acids, such as 3-mercaptopropionic acid, 2-mercaptopropionic acid, thio-salicylic acid, mercaptosuccinic acid, mercaptoacetic acid, or cysteine. Examples of suitable hydroxyl group-containing compounds are diols, triols, and tetraols, such as 1,4-butane diol, 1,6-hexane diol, 2,2-dimethyl-1,3-propane diol, 2-ethyl-2-propyl-1,3-propane diol, 1,2-, 1,3-, and 1,4-cyclohexane diols, and the corresponding cyclohexane dimethanol, 1,1,1-trimethylol propane, 1,2,3-trimethylol propane, and pentaerythritol. Examples of compounds prepared according to such a method include pentaerythritol tetrakis (3-mercaptopropionate), pentaerythritol tetrakis (2-mercaptoacetate), trimethylol propane tris (3-mercaptopropionate), trimethylol propane tris (2-mercaptopropionate), and trimethylol propane tris (2-mercaptoacetate). Good results have been obtained with trimethylol propane tris (3-mercapto propionate) and pentaerythritol tetrakis (3-mercapto propionate). A further example of a compound prepared according to such a method consists of a hyperbranched polyol core based on a starter polyol, e.g., trimethylol propane, and dimethylol propionic acid. This polyol is subsequently esterified with 3-mercaptopropionic acid and isononanoic acid. These methods are described in EP-A 0 448 224 and WO 93/17060.

Other syntheses to prepare compounds comprising polythiols involve:
  the reaction of an aryl or alkyl halide with NaHS to introduce a pendant thiol group into the alkyl and aryl compounds, respectively;
  the reaction of a Grignard reagent with sulphur to introduce a pendant thiol group into the structure;
  the reaction of a polymercaptan with a polyolefin according to a Michael addition reaction, a nucleophilic reaction, an electrophilic reaction or a radical reaction;
  the reaction of a thiol-functional alcohol and an isocyanate-functional compound, and
  the reduction of disulphides.

The polythiol may for example have one or more hydroxyl groups and have a structure according to the following formula: $T[(C_3H_6O)_nCH_2CHOHCH_2SH]_3$, with T being a triol such as trimethylol propane or glycerol. An example of such a compound is commercially available from Henkel under the trademark Henkel Capcure® 3/800.

Alternatively, the polythiol can for instance be a resin having a polyester resin, polyurethane resin, polyacrylate resin, or polyether resin as backbone. These isocyanate-reactive compounds may also comprise hydroxyl groups.

The polythiol may for instance be a polyester prepared from (a) at least one polycarboxylic acid or reactive derivatives thereof, (b) at least one polyol, and (c) at least one thiol-functional carboxylic acid. The polyesters preferably possess a branched structure. Branched polyesters are conventionally obtained through condensation of polycarboxylic acids or reactive derivatives thereof, such as the corresponding-anhydrides or lower alkyl esters, with polyalcohols, when at least one of the reactants has a functionality of at least 3. Examples of suitable polycarboxylic acids or reactive derivatives thereof are tetrahydrophthalic acid, tetrahydrophthalic anhydride, hexahydrophthalic acid, hexahydrophthalic anhydride, methyl hexahydrophthalic acid, methyl hexahydrophthalic anhydride, dimethylcyclohexane dicarboxylate, 1,4-cyclohexane dicarboxylic acid, 1,3-cyclohexane dicarboxylic acid, phthalic acid, phthalic anhydride, isophthalic acid, terephthalic acid, 5-tert. butyl isophthalic acid, trimellitic anhydride, maleic acid, maleic anhydride, fumaric acid, succinic acid, succinic anhydride, dodecenyl succinic anhydride, dimethyl succinate, glutaric acid, adipic acid, dimethyl adipate, azelaic acid, and mixtures thereof. Examples of suitable polyols include trimethylol propane, trimethylol ethane, glycerol, 1,2,6-hexanetriol, ethylene glycol, 1,2-propylene glycol, 1,3-propylene glycol, 2-methyl-propane-1,3-diol, neopentyl glycol, 2-butyl-2-ethyl-1,3-propane diol, cyclohexane-1,4-dimethylol, the monoester of neopentyl glycol and hydroxy-pivalic acid, hydrogenated Bisphenol A, 1,5-pentane diol, 3-methyl-pentane diol, 1,6-hexane diol, 2,2,4-trimethyl pentane-1,3-diol, dimethylol propionic acid, pentaerythritol, di-trimethylol propane, dipentaerythritol, and mixtures thereof. Examples of suitable thiol-functional organic acids include 3-mercaptopropionic acid, 2-mercaptopropionic acid, thio-salicylic acid, mercaptosuccinic acid, mercaptoacetic acid, cysteine, and mixtures thereof. Optionally, monocarboxylic acids and monoalcohols may be used in the preparation of the polyesters. Preferably, $C_4$-$C_{18}$ monocarboxylic acids and $C_6$-$C_{18}$ monoalcohols are used. Examples of the $C_4$-$C_{18}$ monocarboxylic acids include pivalic acid, hexanoic acid, heptanoic acid, octanoic acid, nonanoic acid, 2-ethylhexanoic acid, isononanoic acid, decanoic acid, lauric acid, myristic acid, palmitic acid, isostearic acid, stearic acid, hydroxystearic acid, benzoic acid, 4-tert. butyl benzoic acid, and mixtures thereof. Examples of the $C_6$-$C_{18}$ monoalcohols include cyclohexanol, 2-ethylhexanol, stearyl alcohol, and 4-tert. butyl cyclohexanol.

Alternatively, the polythiol may be a thiol-functional polyacrylate. Such polyacrylate can be derived from (meth)acrylic monomers such as (meth)acrylic acid, methyl (meth)acrylate, butyl (meth)acrylate, a vinyl derivative such as styrene, and optionally hydroxy-functional acrylic monomers, such as hydroxy ethyl (meth)acrylate, hydroxy propyl (meth)acrylate, hydroxy butyl (meth)acrylate and the like, or mixtures thereof, with the terms (meth)acrylate and (meth)acrylic acid referring to both methacrylate and acrylate and methacrylic acid and acrylic acid, respectively. The thiol group is introduced by the reaction product of dimethyl-m-isopropenyl benzyl isocyanate and mercapto ethanol. Alternatively, glycidyl methacrylate is introduced into the polymer to prepare an epoxy-functional polyacrylate. The epoxy groups are then reacted with suitable thiol-functional organic acids such as mentioned above. The polyacrylate is prepared by conventional methods, for instance, by the slow addition of appropriate monomers to a solution of an appropriate polymerization initiator, such as an azo or peroxy initiator.

Also included in the coating compositions of the invention may be di-, tri-, or higher thiol-functional diluents such as ethane dithiol or bis-beta-mercapto-ethyl sulphide. Preference is given to the use of higher-molecular weight thiol-functional compounds, which may be obtained by reaction of a polythiol-functional compound-with a polyisocyanate.

Suitable organic polyisocyanates include polyfunctional, preferably free polyisocyanates, with an average NCO functionality of 2.5 to 5, and may be (cyclo)aliphatic, araliphatic or aromatic in nature. The organic polyisocyanate may be blocked. The polyisocyanate may include biuret, urethane, uretdione, and isocyanurate derivatives. Examples of these organic polyisocyanates include 1,6-diisocyanatohexane, isophorone diisocyanate, 2,4-toluene diisocyanate, 2,6-toluene diisocyanate, diphenyl methane-diisocyanate, 4,4'-bis(isocyanato-cyclohexyl) methane, 1,4-diisocyanatobutane, 1,5diisocyanato-2,2-dimethyl pentane, 2,2,4-trimethyl-1,6-diisocyanatohexane, 1,10-diisocyanatodecane 4,4-diisocyanato-cyclohexane, 2,4-hexahydrotoluene diisocyanate, 2,6-hexahydrotoluene diisocyanate, norbornane diisocyanate, 1,3-xylylene diisocyanate, 1,4-xylylene diisocyanate, 1-isocyanato-3-(isocyanato methyl)-1-methyl cyclohexane, m-$\alpha$, $\alpha$-$\alpha'$,$\alpha'$-tetramethyl xylylene diisocyanate, the above-mentioned derivatives thereof, and mixtures thereof. Normally, these products are liquid at ambient temperature and commercially available in a wide range. Particularly suitable isocyanate curing agents are triisocyanates and adducts. Examples thereof are 1,8-diisocyanato-4-(isocyanatomethyl) octane, the adduct of 3 moles of toluene diisocyanate to 1 mole of trimethylol propane, the isocyanurate trimer of 1,6-diisocyanatohexane, the isocyanurate trimer of isophorone diisocyanate, the uretdione dimer of 1,6-diisocyanatohexane, the biuret trimer of 1,6-diisocyanatohexane, the adduct of 3 moles of m-$\alpha$,$\alpha$-$\alpha'$,$\alpha'$-tetramethyl xylene diisocyanate to mole of trimethylol propane, and mixtures thereof. Preferred are cyclic trimers (isocyanurates) and uretdiones of 1,6-hexane diisocyanate and isophorone diisocyanate. Usually these compounds contain small quantities of their higher homologues.

Optionally, a hydroxyl-functional compound comprising at least two hydroxyl-functional groups may be present in the curable material. The hydroxyl-functional compound comprising at least two hydroxyl-functional groups may be selected from polyester polyols, polyether polyols, polyacrylate polyols, polyurethane polyols, cellulose acetobutyrate, hydroxyl-functional epoxy resins, alkyds, and dendrimec, polyols such as described in WO 93/17060. Also, hydroxyl-functional oligomers and monomers, such as castor oil-and trimethylol propane, may be included. A suitable polyol is an acrylate polyol, such as for example Setalux® 1157 available from Nuplex.

The polyisocyanate can be mixed with the polythiols by any suitable technique. However, simply stirring usually is sufficient. Sometimes it can be useful to dilute the polyisocyanate somewhat with an organic solvent such as ethyl acetate or 1-methoxy-2-propyl acetate to reduce its viscosity.

The pot life of the coating composition at ambient temperature usually is more than a quarter of an hour, e.g. more than half an hour, up to about 5 hours or even longer, depending on the catalysts used and their amounts and whether or not blocking acids are used.

The composition according to the present invention can be a solvent borne composition or a solvent-free composition. Since the composition may be composed of liquid oligomers, it is especially suitable for use as a high-solids composition or a solvent-free composition. The coating composition can also be used in powder coating compositions and hot melt coatings-compositions. Preferably, the theoretical volatile organic content (VOC) in the composition is less than about 450 g/l, more preferably less than about 350 g/l, most preferably less than about 250 g/l, or even less than 100 g/l.

The coating compositions may further comprise other ingredients, additives or auxiliaries, such as pigments, dyes, emulsifiers (surfactants), pigment dispersion aids, photosensitizers, leveling agents, anti-cratering agents, antifoaming agents, antisagging agents, heat stabilisers, UV absorbers, antioxidants, and fillers.

The coating composition of the present invention can be applied to any substrate. The substrate may be, for example, metal, plastic, wood, glass, ceramic, or some other coating layer. The other coating layer may be comprised of the coating composition of the current invention or it may be a different coating composition. The coating compositions of the current invention show particular utility as a floor coating, e.g. on concrete floors or as a coating or repair coating, e.g. as a primer or as a clear coat, for vehicles, such as cars, trains, air planes or the like.

The coating compositions can be applied by conventional means such as by spray gun, brush, or roller, spraying being preferred. Curing temperatures are generally between 0 and 100° C., e.g., between 0 and 30° C.

The invention is further illustrated by the following examples. In these examples the compositions listed below are available as indicated.

| | |
|---|---|
| Actilane ® 411 | an acrylate, commercially available from Akzo Nobel Chemicals; |
| Aerosil ® R 972 | hydrophobically modified silica, commercially available from Degussa; |
| Ancamine ® K54 | tris-(dimethyl amino methyl) phenol, commercially available from Air Products; |
| ASP 600 | hydrous aluminosilicates, commercially available from Engelhard; |
| Autobase ® Plus | car repair base coat, commercially available from Akzo Nobel Car Refinishes; |

-continued

| | |
|---|---|
| Byk ® 306 | surfactant, commercially available from Byk; |
| Colour Black FW2 | carbon black, commercially available from Degussa; |
| Desmodur ® DN | a polyisocyanate, commercially available from Bayer; |
| Desmodur ® E14 | a polyisocyanate, commercially available from Bayer; |
| Disperbyk ® 110 | dispersant, commercially available from Byk; |
| Hardener OZ | urethane bis-oxazolidine, commercially available from Bayer; |
| Incozol ® LV | carbonato-bis-N-ethyl-2-isopropyl-1,3-oxazolidine, commercially available from Industrial Copolymers Limited |
| Incozol ® 2 | 2-(3-heptyl)-N-butyl-1,3-oxazolane, commercially available from Industrial Copolymers Limited; |
| Irgacure ® 784 | a photoinitiator, commercially available from Ciba Specialty Chemicals; |
| Speedcure ® BMS | a photoinitiator, commercially available from Lambson; |
| Tipure ® R 902 | titanium dioxide, commercially available from DuPont; |
| Tolonate ® HDT LV | a polyisocyanate, commercially available from Rhodia; |
| Vestamin ® A 139 | an aldimine, commercially available from Degussa-Hüls; |
| Zeeospheres ® W-210 | ceramic microspheres, available from 3M. |

In the examples, all amounts of contents are given in grams, unless indicated otherwise.

The following test methods were used:

| | |
|---|---|
| Pot life | The time during which the system could be brush-applied after mixing the components; |
| Drying time | The coating composition was applied on a glass plate with a draw bar. The layer thickness was 125 µm, the temperature was 20° C. Drying was tested by means of a BK Drying Recorder. The results can be classified as follows: |
| | Phase 1: the line traced by the pin closes up again ("open times"); |
| | Phase 2: the pin traces a straight line in the paint which does not close up again ("tack-free times"); |
| | Phase 3: the pin traces a scratchy line ("dust free"); |
| | Phase 4: the pin does not leave a scratch ("scratch-free time"). |
| Viscosity | measured using a Rheometer (Rheolab MC1, spindle: Z2 DIN); after 15 minutes resting, the viscosity was measured over 1 minute with a speed of 150 rotations per minute. This program was repeated several times. |

EXAMPLE 1

A two-component coating composition was prepared. The first component comprised pentaerythritol 3-mercaptopropionate and 40% butyl acetate. The second component comprised a polyisocyanate (Tolonate® HDT LV) and 6% oxazolidine (Hardener OZ).

The components were stoichiometrically mixed before application. The Phase-4 cure time was 60 minutes (at 85% RH), the viscosity in the can at that time was: 0.13 Pa.s. The pot life was 3 hours.

EXAMPLE 2

A two-component coating composition was prepared. The first component comprised pentaerythritol 3-mercaptopropionate and 40% butyl acetate. The second component comprised a polyisocyanate (Tolonate® HDT LV) and 6% oxazolidine (Incozol® 2).

The components were stoichiometrically mixed before application. The Phased cure time was: 20 minutes (at 85% RH), the viscosity at that time was: 0.25 Pa.s.

EXAMPLE 3

A two-component coating composition was prepared. The first component comprised pentaerythritol 3-mercaptopropionate and 40% butyl acetate. The second component comprised a polyisocyanate (Tolonate® HDT LV) and 6% oxazolidine (Incozol® LV).

The components were stoichiometrically mixed before application. The Phase-4 cure time was: 80 minutes (at 85% RH), the viscosity at that time was: 0.10 Pa.s.

EXAMPLE 4

To the formulation in Example 1, 1% Speedcuree BMS was added. The sample was applied on a panel and the panel was irradiated with a UV-A lamp at 20 cm (UVAHAND-250, 35 mW/cm$^2$). The Phase-4 cure time was reduced to 10 minutes. The pot life was not affected by the addition of Speedcure® BMS and remained 3 h.

EXAMPLE 5

To the formulation in Example 1, 1% Speedcure® BMS, 10% TiO$_2$ (Tipure® R902-38), and 1% organic black (Colour Black FW2) were added. The sample was applied on a panel and the panel was irradiated with the UV-A lamp at 20 cm. The Phase-4 cure time was reduced to 20 minutes.

EXAMPLE 6

To the formulation in Example 1, 1%. lrgacuree 784 was added. The sample was applied on a panel and the panel was irradiated with a 1000 W construction lamp at 50 cm. The Phase-4 cure time was reduced to 3 minutes. The pot life was not affected by the addition of Irgacure® 784.

EXAMPLE 7

To the formulation in Example 4, 0.03% HNO$_3$ was added. The sample was applied on a panel and the panel was irradiated with the UV-A lamp at 20 cm. The Phase-4 cure time remained 10 minutes. The pot life was doubled.

EXAMPLE 8

A solvent free, two-component coating composition was prepared. The first component comprised pentaerythritol 3-mercaptopropionate and 1% Speedcure® BMS. The second component comprised a polyisocyanate (Tolonate® HDT LV) and 2% oxazolidine (Incozol® LV). The sample was applied on a panel and the panel was irradiated with the UV-A lamp at 20 cm. The Phase-4 cure time was 20 minutes (at 60% RH). The pot life was 45 minutes.

EXAMPLE 9

A two-component coating composition was prepared. The first component comprised pentaerythritol 3-mercaptopropionate and 40% butyl acetate. The second component comprised a polyisocyanate (Desmodur® E14, Bayer) and 6% oxazolidine (Hardener OZ).

The components were stoichiometrically mixed before application. The Phase-4 cure time was 1.5 h (60% RH), the potlife was 2 h.

EXAMPLE 10

A two-component coating composition was prepared. The first component comprised pentaerythritol 3-mercaptopropionate and 40% butyl acetate. The second component comprised a polyisocyanate (Desmodur® DN) and 6% oxazolidine (Hardener OZ).

The components were stoichiometrically mixed before application. The Phase-4 cure time was 1.5 h (60% RH), the pot life was 2 h.

EXAMPLE 11

A two-component coating composition was prepared. The first component comprised pentaerythritol 3-mercaptopropionate and 40% butyl acetate. The second component comprised a polyisocyanate (Tolonate® HDT LV) and 6% ketimine (Vestamin® A 139).

The components were stoichiometrically mixed before application. The Phase-4 cure time was 2.0 h (60% RH), the pot life was 2 h.

Comparative Example 1

A two-component coating composition was prepared. The first component comprised pentaerythritol 3-mercaptopropionate, 15% butyl acetate, and 0.25% triphenylphospine. The second component comprised a polyisocyanate (Tolonate® HDT LV) and 2% acrylate (Actilane® 411).

The components were stoichiometrically mixed before application. The Phase-4 cure time was: 1.5 h (at 20° C. and 85% RV), the pot life was 30 minutes.

Comparative Example 2

A two-component coating composition was prepared. The first component comprised pentaerythritol 3-mercaptopropionate, 15% butyl acetate, and 0.05% Ancamine® k54 (Air Products). The second component comprised a polyisocyanate (Tolonate® HDT LV, Rhodia).

The components were stoichiometrically mixed before application. The Phase-4 cure time was: 3.0 h (at 20° C. and 85% RV), the pot life was 20 minutes.

EXAMPLE 12

A three-component floor coating was prepared including a thiol component A, an isocyanate component B and a catalyst component C. Component A comprised 83 wt. % pentaerythritol tetrad (3-mercaptopropionate), 16.5 wt. % TiO2 (Tipure® R 902) and about 0.5 wt. % of a silicone based defoamer (Byk® A-525). A pigment paste is also added to component A, in any desired amount. If a black pigment paste is used, the paste should contain, per 1 parts by weight (pbw) of carbon black (Farbruss FW2), 20 pbw of pentaerythritol tetra (3-mercaptopropionate), 0.2 pbw of Byk® A-525 defoamer, and 0.04 pbw of methyl-di-ethanolamine to neutralize the acidity. Component B comprises 100% of the isocyanurate of hexamethylene diisocyanate (Tolonate® HDT-LV2). Component C comprises 120 pbw sand, 15 pbw quartz sand and 1-4 wt. % of Incozol® 2.

Components A and B were mixed in a ratio A:B=48:52 and applied on a concrete substrate. Subsequently, the sand component C was sprinkled over the freshly applied layer to catalyze the NCO—SH cross-linking. A second layer of components A+B is applied after the sand has been sprinkled over the first layer.

EXAMPLE 13

A two-component clear coat was prepared. The first component comprised pentaerythritol 3-mercaptopropionate, 0.8 wt. % (on total weight of solid binder) Speedcure® BMS, 14.6 wt. % (on total weight of solid binder) butyl acetate and an additive for reducing the surface tension (Byk® 306).

The second component comprised a polyisocyanate (Tolonate® HDT LV), 7.7% (on total solid binder) xylene and 5.2% (on total solid binder) oxazolidine (Hardener OZ, Bayer).

The components were stoichiometrically mixed before application. The pot life was 20 minutes. The sample was used to apply a clearcoat (approx. 60 µm) on panels with a blue (Halcyon Blue M.2c) solvent based basecoat (Autobase® Plus of Akzo Nobel Car Refinishes). After 3 minutes flash-off, these panels were irradiated with UV-A light from 4 TL-10R tubes (Philips lightning: 11-13 mW/cm2). The through cure time of the clearcoat was 14 minutes (at 45% RH). The through cure time of these panels without UV (shadow-cure) was approximately 90 minutes (at 45% RH).

EXAMPLE 14

Example 13 was repeated, while 4% (on weight) oxazolidine was added to the solvent borne basecoat. After drying of the basecoat, the two component composition of example 1 was used to apply a clearcoat of 60 µm on this basecoat. After flash-off the panel was irradiated by UV-A light. The through cure was accelerated from 14 to 9 minutes.

EXAMPLE 15

A two component UV-primer was made with a pigment volume concentration PVC of 30. The first component comprised pentaerythritol 3-mercaptopropionate, isobutyl acetate, 0.3 wt. % (on total weight of solid binder) Disperbyk® 1:10, 52.8 wt. % (on total weight of solid binder) Zeeospheres® W-210 (available from 3M), Aerosil® R 972 (available from Degussa) and 35.9 wt. % (on total weight of solid binder) ASP 600 (available from Engelhard corp.). These solid materials were milled in the pentaerythritol 3-mercaptopropionate and isobutyl acetate with the help of a dissolver to 20 µm. At the end, 0.7 wt. % (on total weight of solid binder) of Byk® 306 was added.

The second component comprised a polyisocyanate (Tolonate® HDT LV), xylene, 5.6 wt. % (on total weight of solid binder) of oxazolidine (Hardener OZ, Bayer) and 0.7 wt. % (on total weight of solid binder) of Speedcure® BMS.

The components were mixed (the equivalence ratio SH:NCO 100:125) before application. The pot life was approximately 20 minutes. The coating composition was applied on tinplate with a draw bar. The (dry) layer thickness was 110-120 µm. After 3 minutes flash-off, these panels were irradiated with UV-A light. The through cure time of the primer was 15 minutes (at 45% RH). The coating was good sandable in 60 minutes. The through cure time of these panels without UV (shadow-cure) was approximately 60 minutes (at 45% RH). After 3 hours sanding was reasonable.

The invention claimed is
1. Coating composition comprising:
   i) a curable material comprising one or more polythiols and one or more polyisocyanates, wherein the equivalence ratio NCO:SH is between 1:2 and 2:1 and
   ii) a latent base catalyst which is activatable by moisture.

2. A coating composition according to claim 1, wherein the latent catalyst is selected from the group consisting of oxazolidine, aldimine, ketimine, and enamine.

3. A coating composition according to claim 1, wherein the latent catalyst is present in an amount of 0.01 to 20% relative to the weight of the curable material.

4. A coating composition according to claim 1, further comprising one or more photoinitiators.

5. A coating composition according to claim 4, wherein the one or more photoinitiators are present in an amount of 0.001 to 4% relative to the weight of the curable material.

6. A coating composition according to claim 4, wherein the latent catalyst is oxazolidine.

7. A coating composition according to claim 1, further comprising an inorganic acid.

8. A process for catalyzing a base-catalyzed coating composition, the process comprising adding a combination of oxazolidine and a photoinitiator to a base-catalyzed coating composition.

9. A process for applying a car repair primer or a car repair clear coat to a car, the process comprising applying the coating composition according to claim 1 to a car.

10. A process for coating a floor, the process comprising applying the coating composition according to claim 1 to a concrete floor.

11. A coating composition according to claim 3, wherein the latent catalyst is present in an amount of 0.01 to 10% relative to the weight of the curable material.

12. A coating composition according to claim 3, wherein the latent catalyst is present in an amount of 0.9 to 6% relative to the weight of the curable material.

13. A coating composition according to claim 2, further comprising one or more photoinitiators.

14. A coating composition according to claim 3, further comprising one or more photoinitiators.

15. A coating composition according to claim 4, wherein the one or more photoinitiators are present in an amount of 0.001 to 1.2% relative to the weight of the curable material.

16. A coating composition according to claim 5, wherein the latent catalyst is oxazolidine.

17. A coating composition according to claim 15, wherein the latent catalyst is oxazolidine.

18. A coating composition according to claim 7, wherein the inorganic acid is nitric acid.

19. A coating composition according to claim 4, further comprising an inorganic acid.

20. A coating composition according to claim 6, further comprising nitric acid.

21. A coating composition according to claim 6, wherein the composition comprises from 0.01 to 6% oxazolidone and from 0.01 to 2% photoinitator, relative to the weight of the curable material.

22. A coating composition comprising:
   i) a curable material comprising one or more polythiols and one or more polyisocyanates, wherein the equivalence ratio NCO:SH is between 1:2 and 2:1;
   ii) a latent base catalyst which is activatable by moisture; and
   iii) an inorganic acid.

23. A process for catalyzing a base-catalyzed coating composition, the process comprising adding a combination of oxazolidine, a photoinitiator, and an inorganic acid to a base-catalyzed coating composition.

* * * * *